March 11, 1941. R. H. PLASS 2,234,352
DEHAIRING OF PELTS
Filed June 30, 1937 12 Sheets-Sheet 4
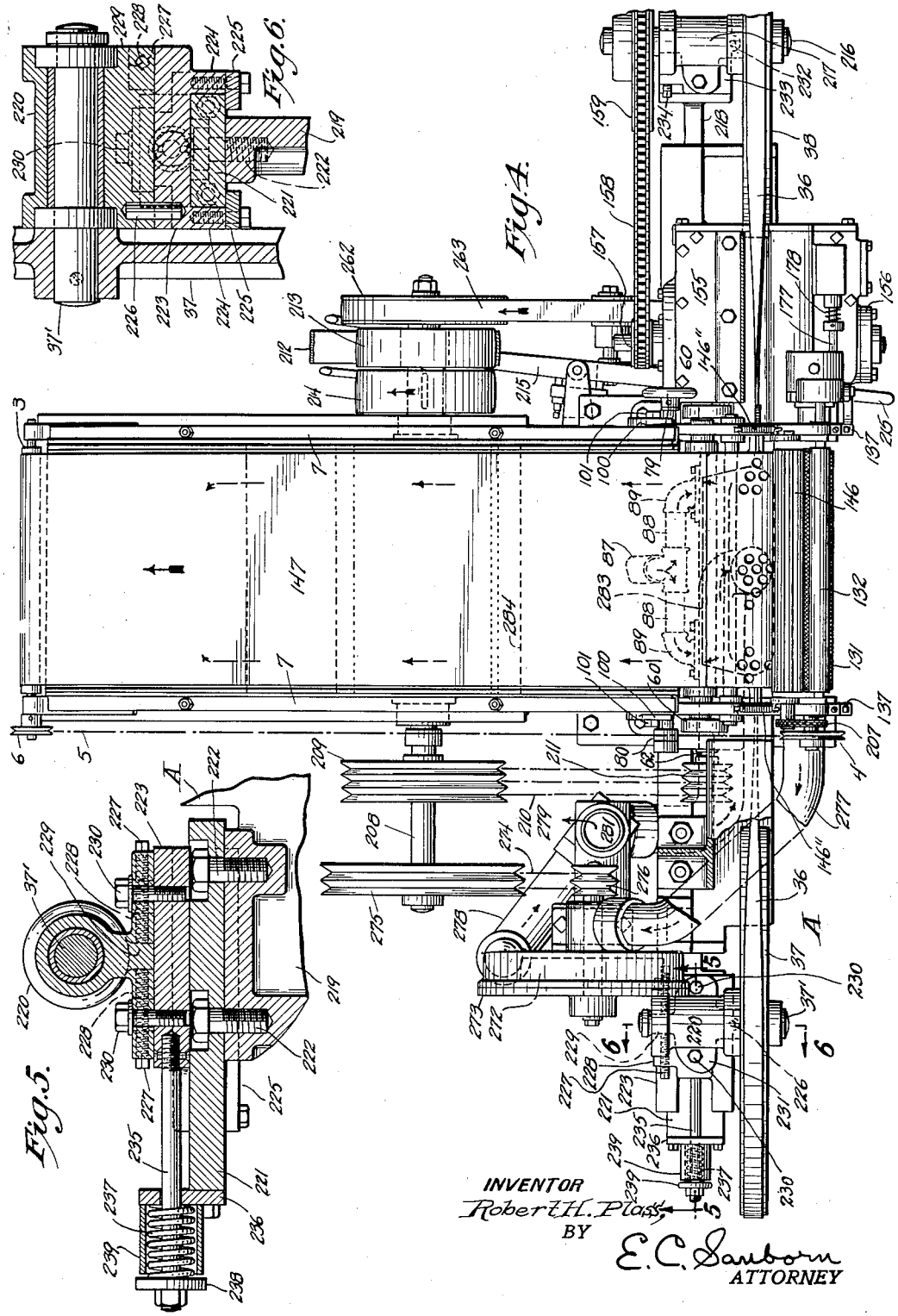
INVENTOR
Robert H. Plass
BY
E. C. Sanborn
ATTORNEY

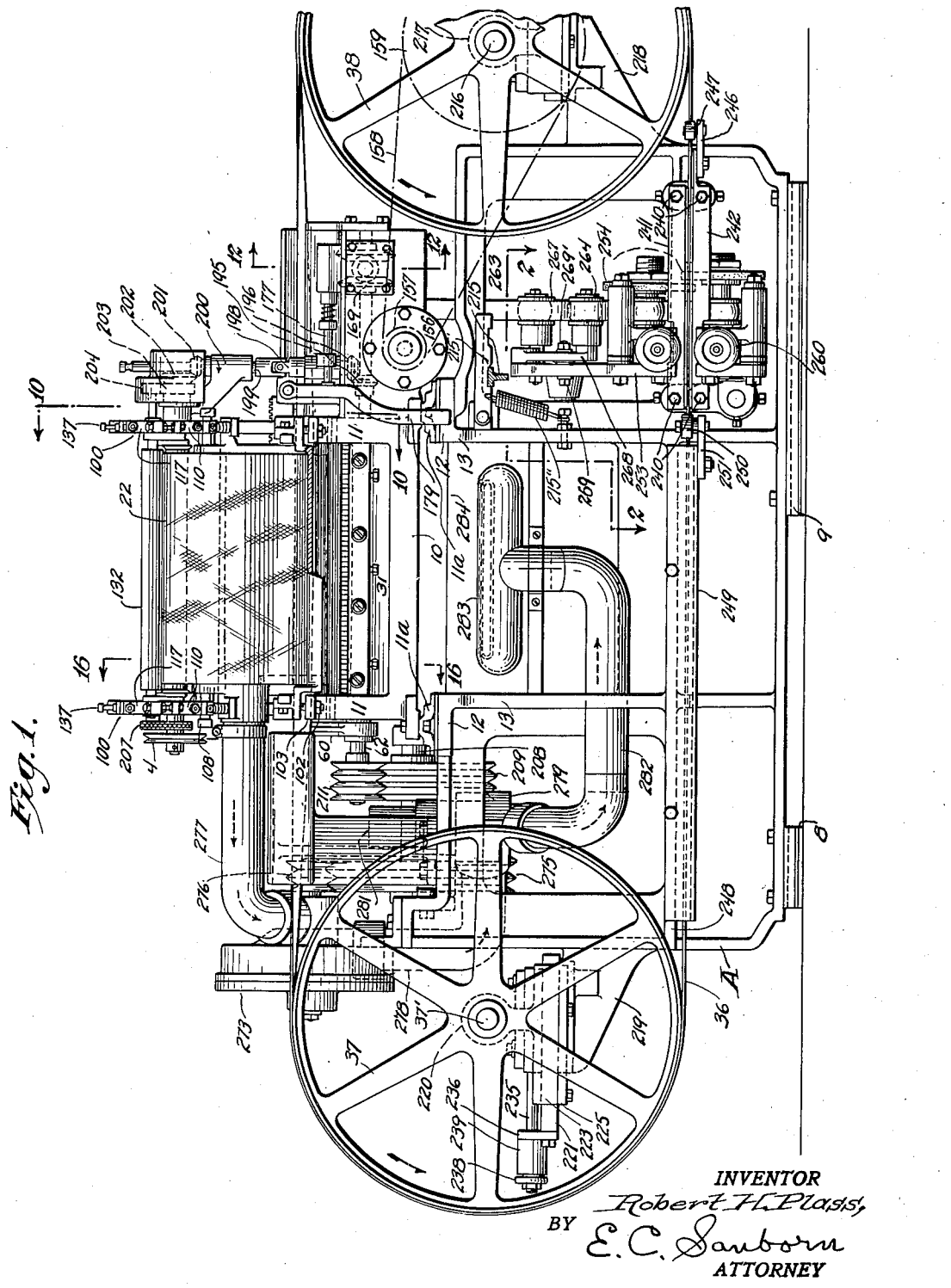

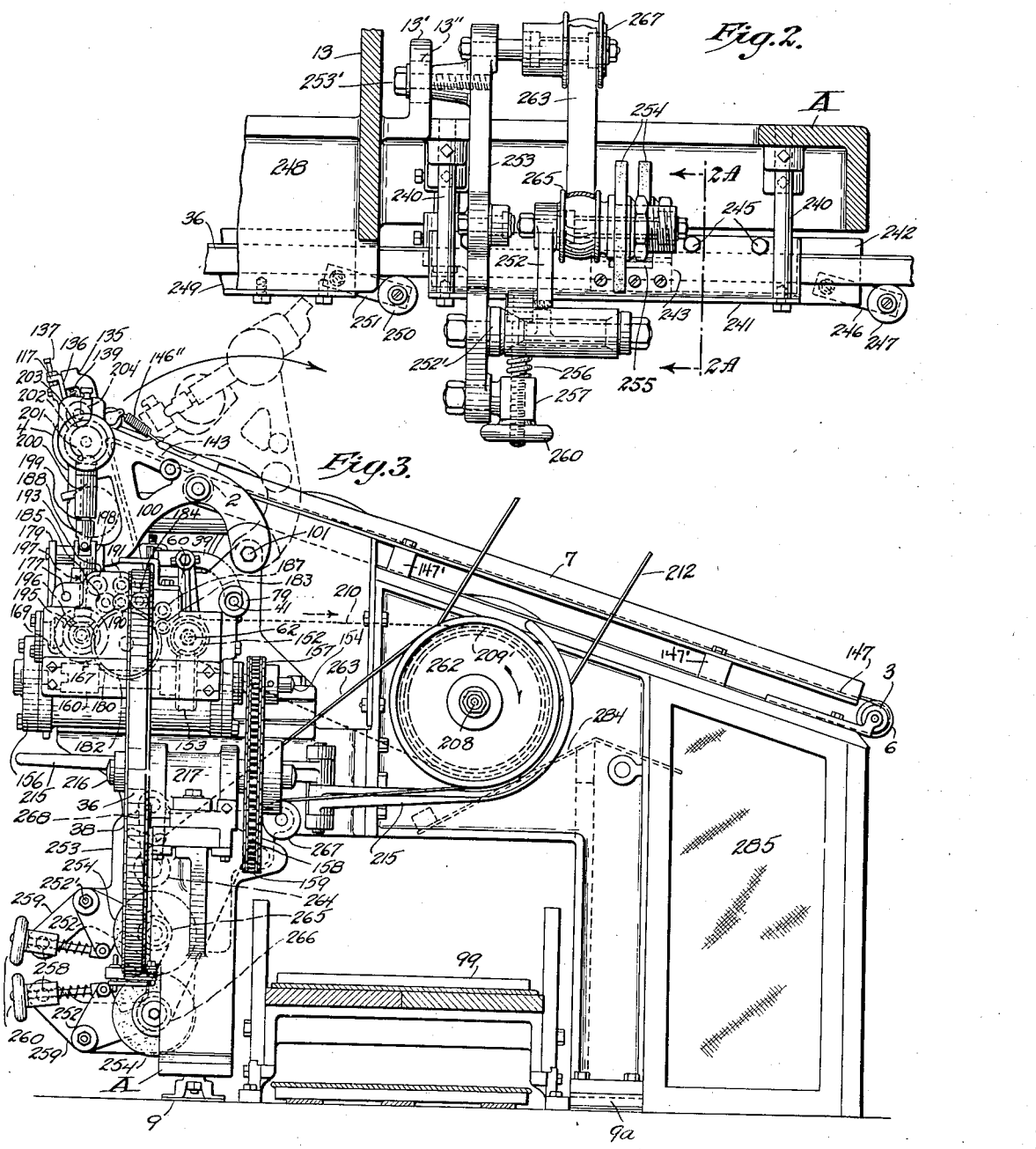

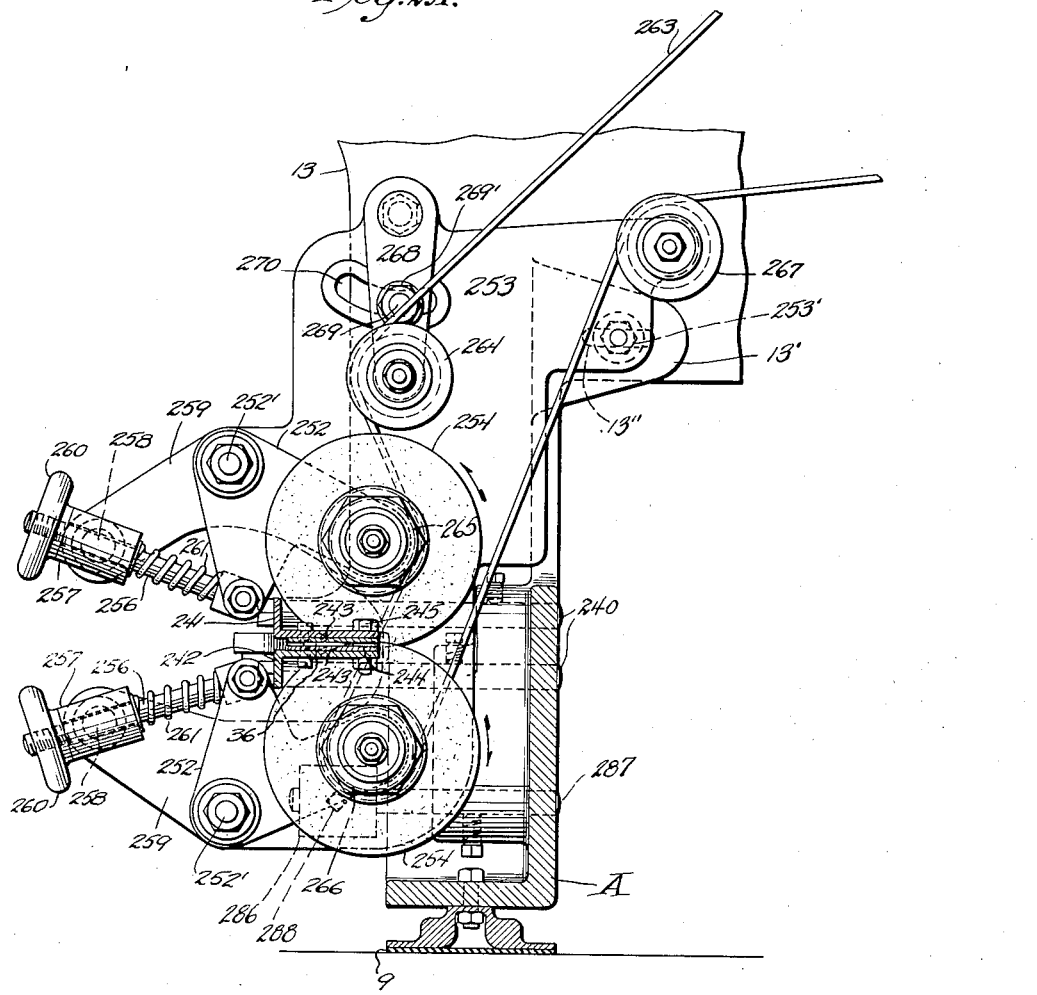

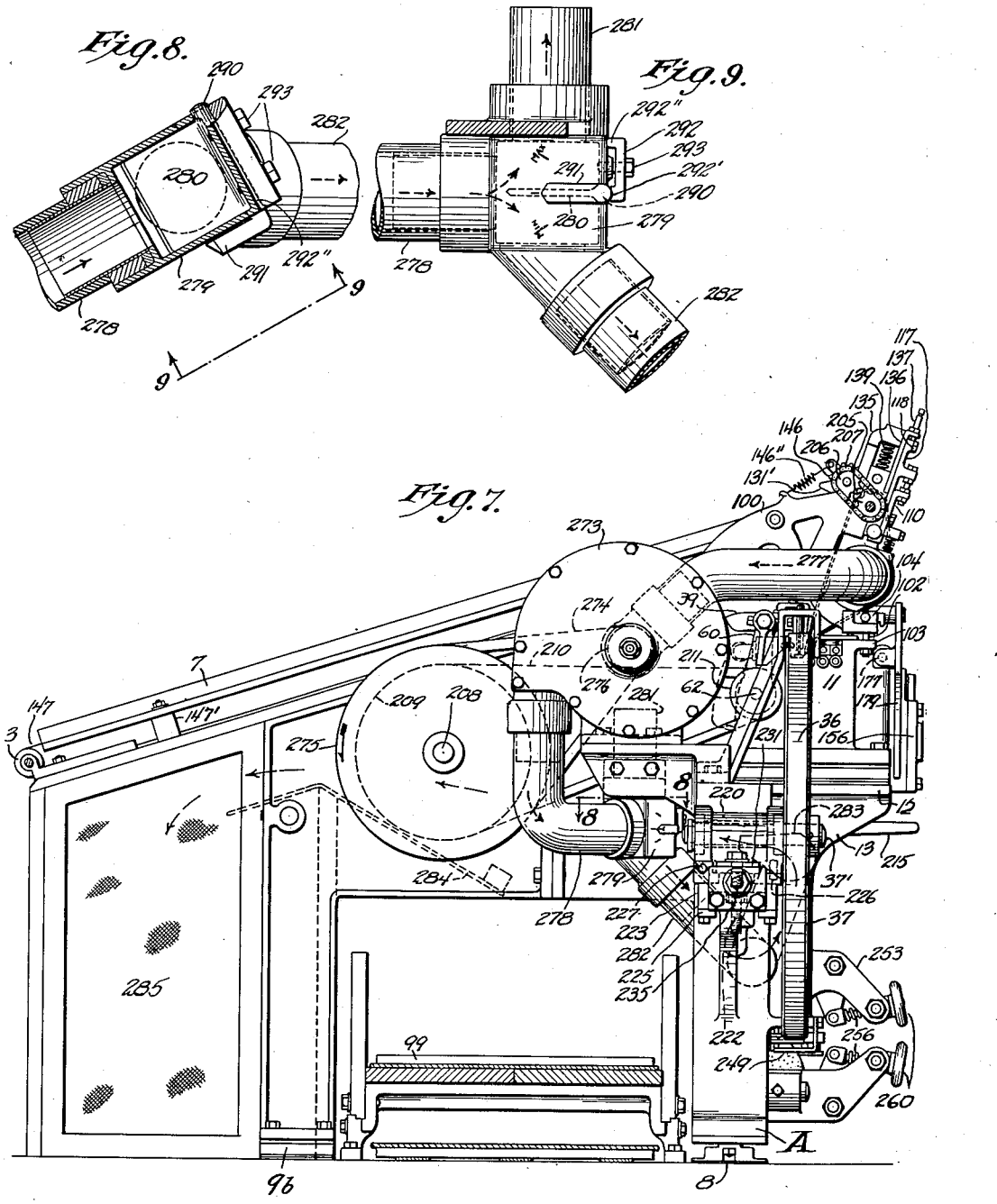

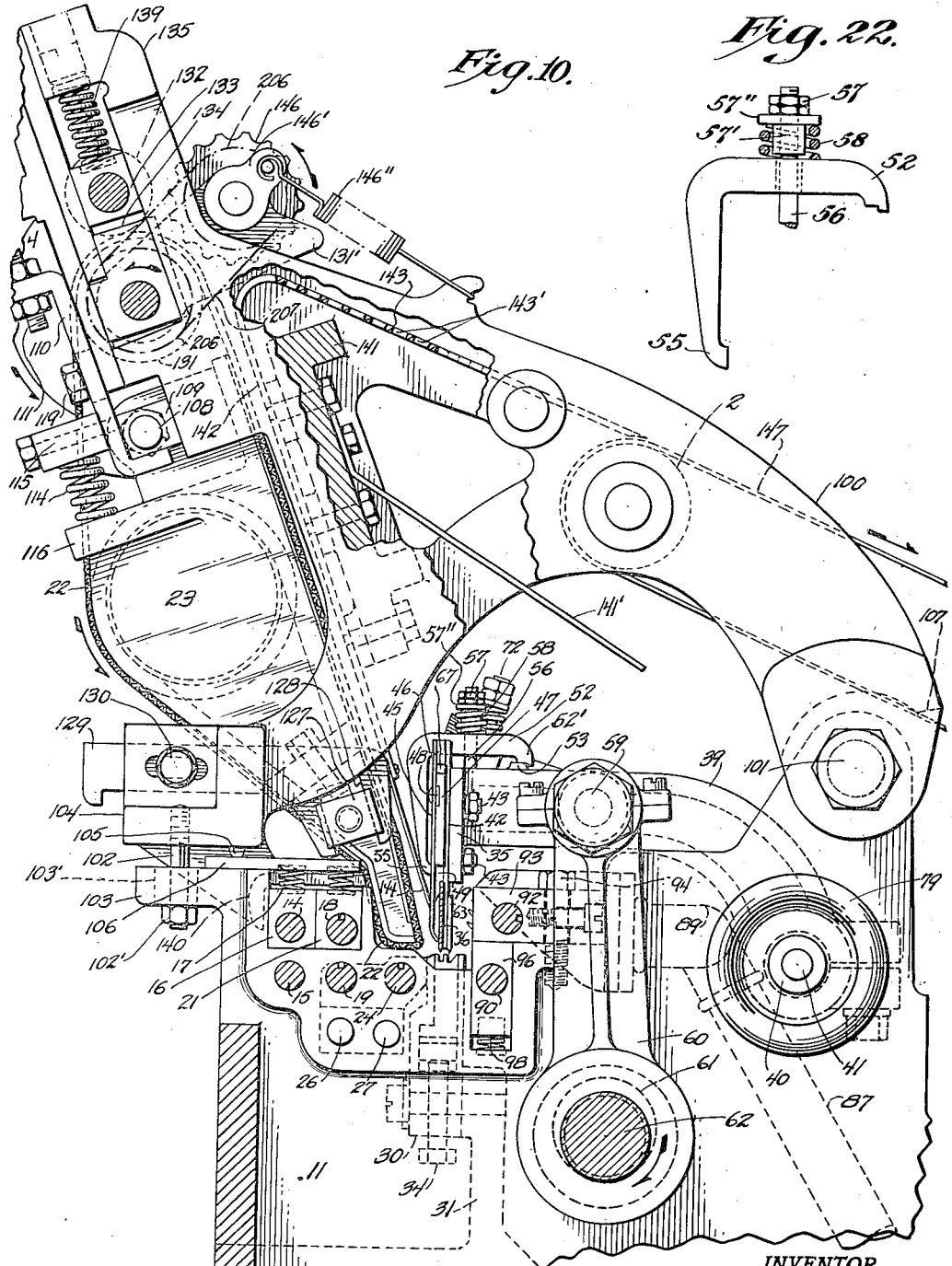

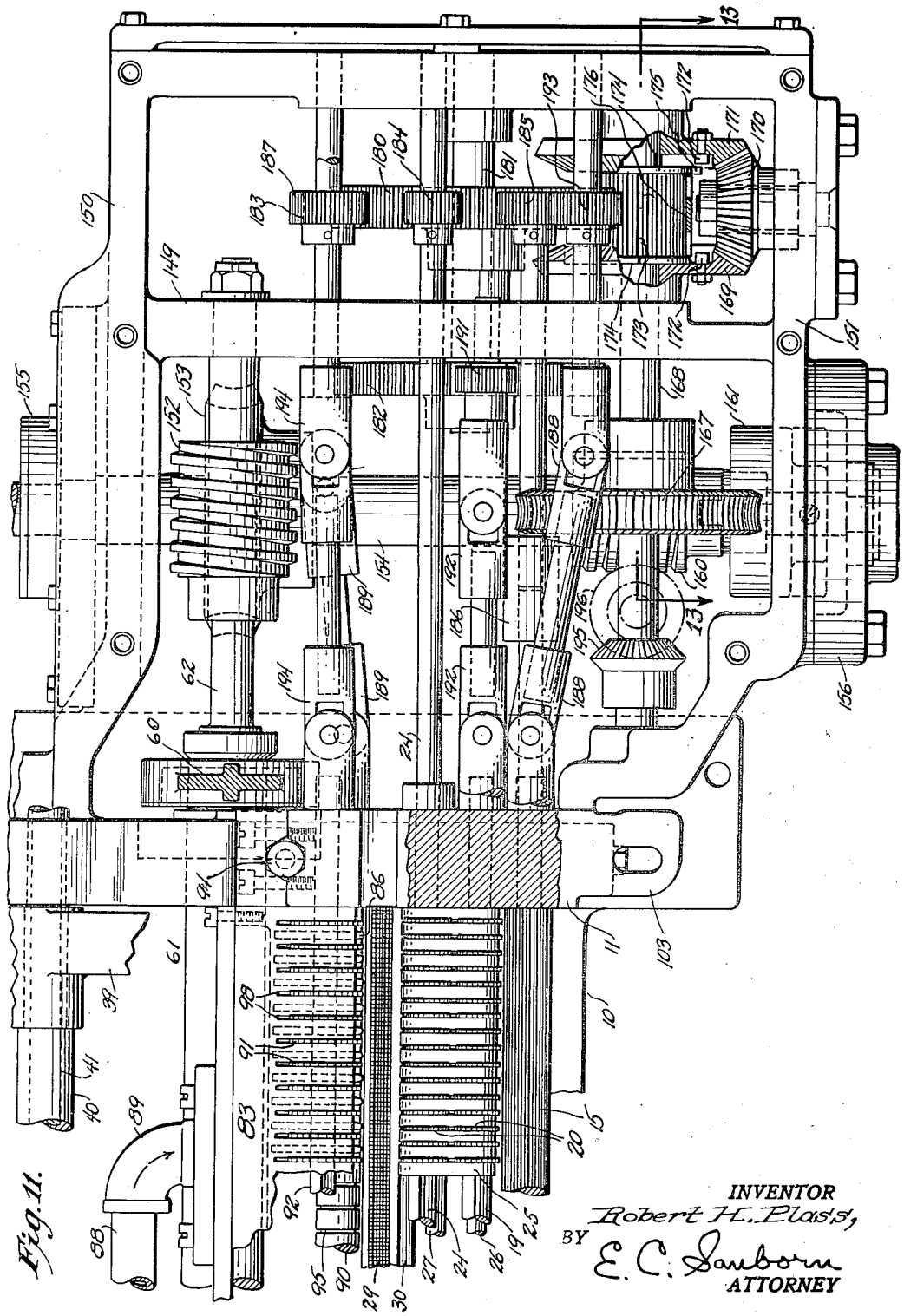

INVENTOR
Robert H. Plass,
BY
E. C. Sanborn
ATTORNEY

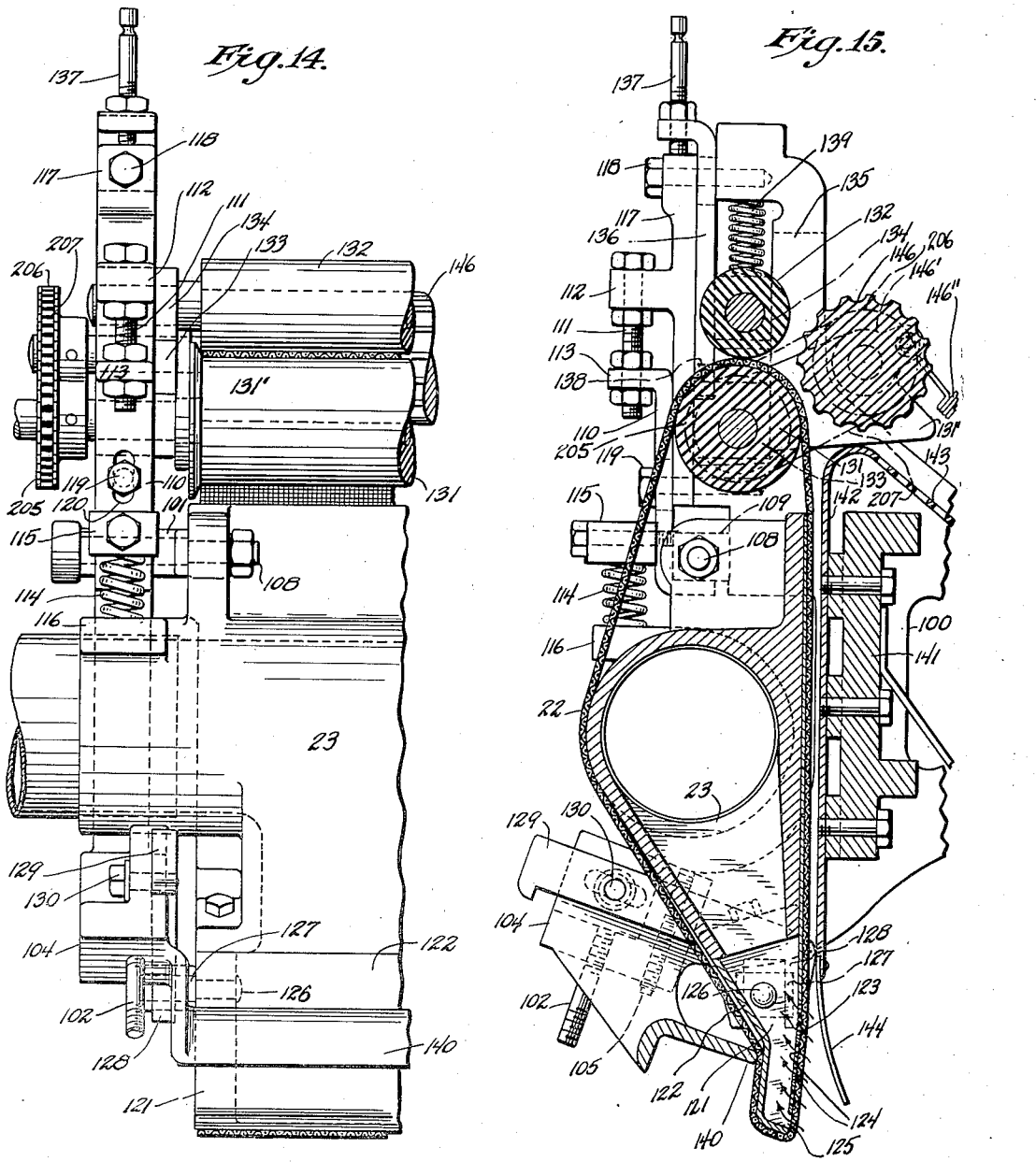

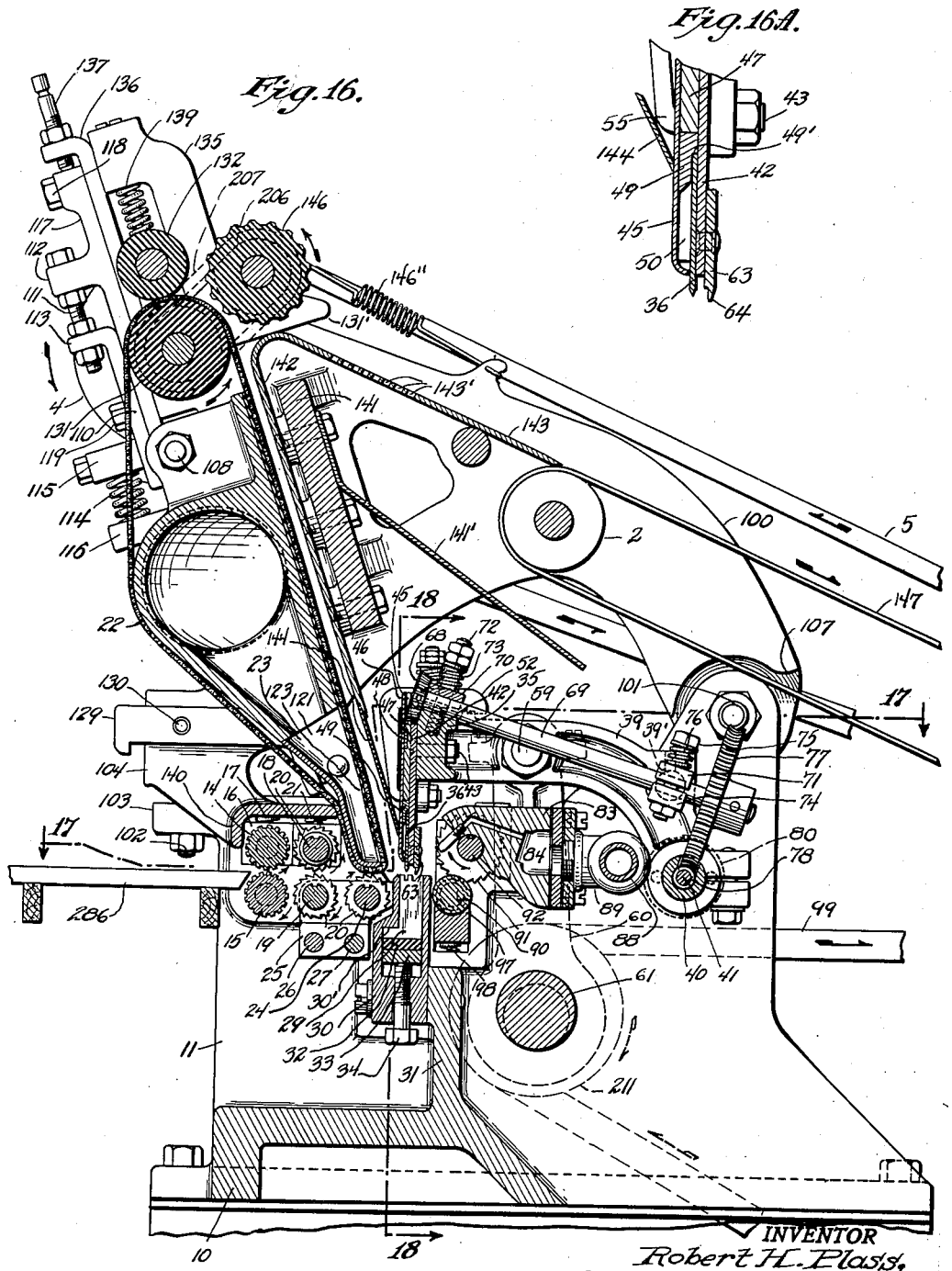

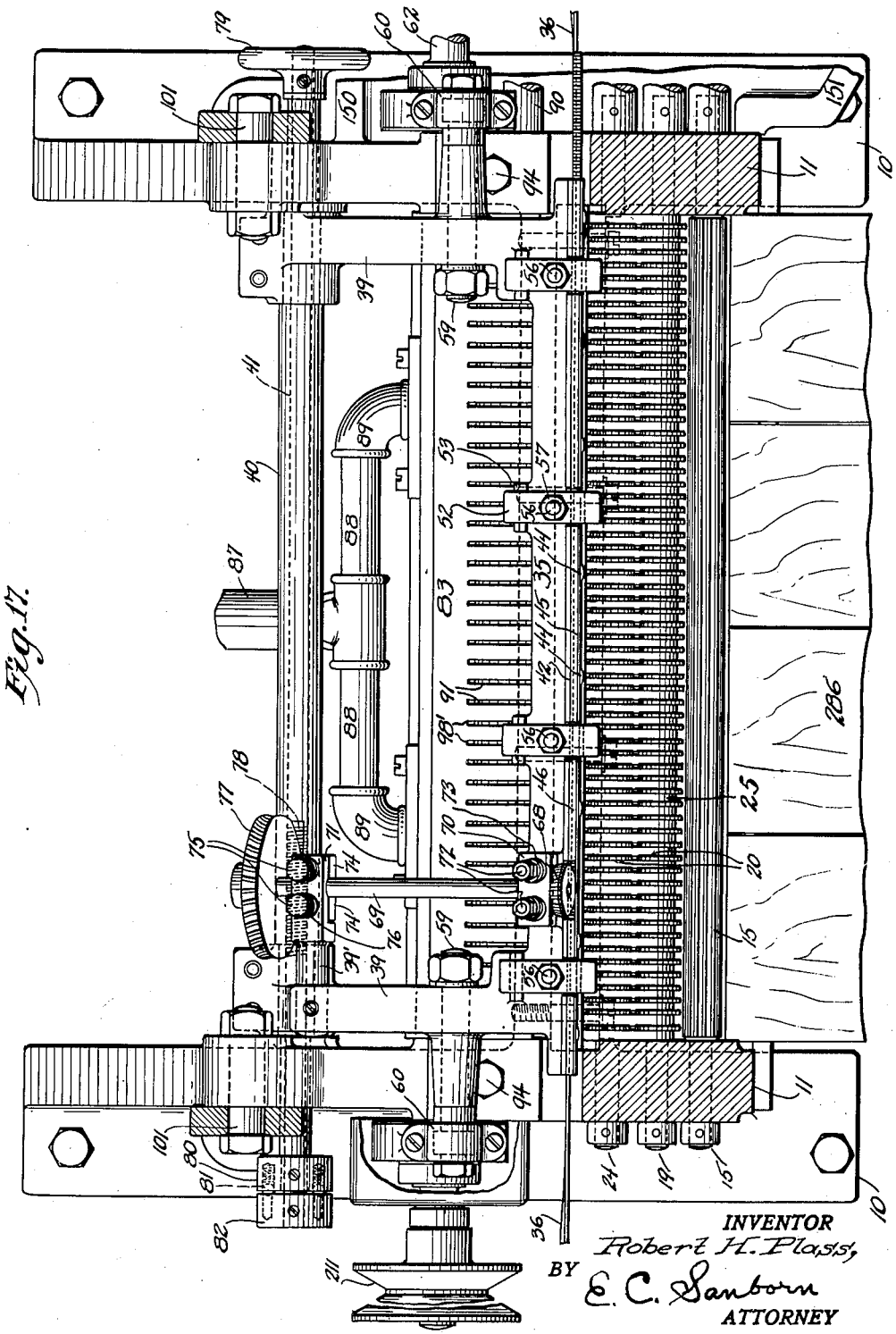

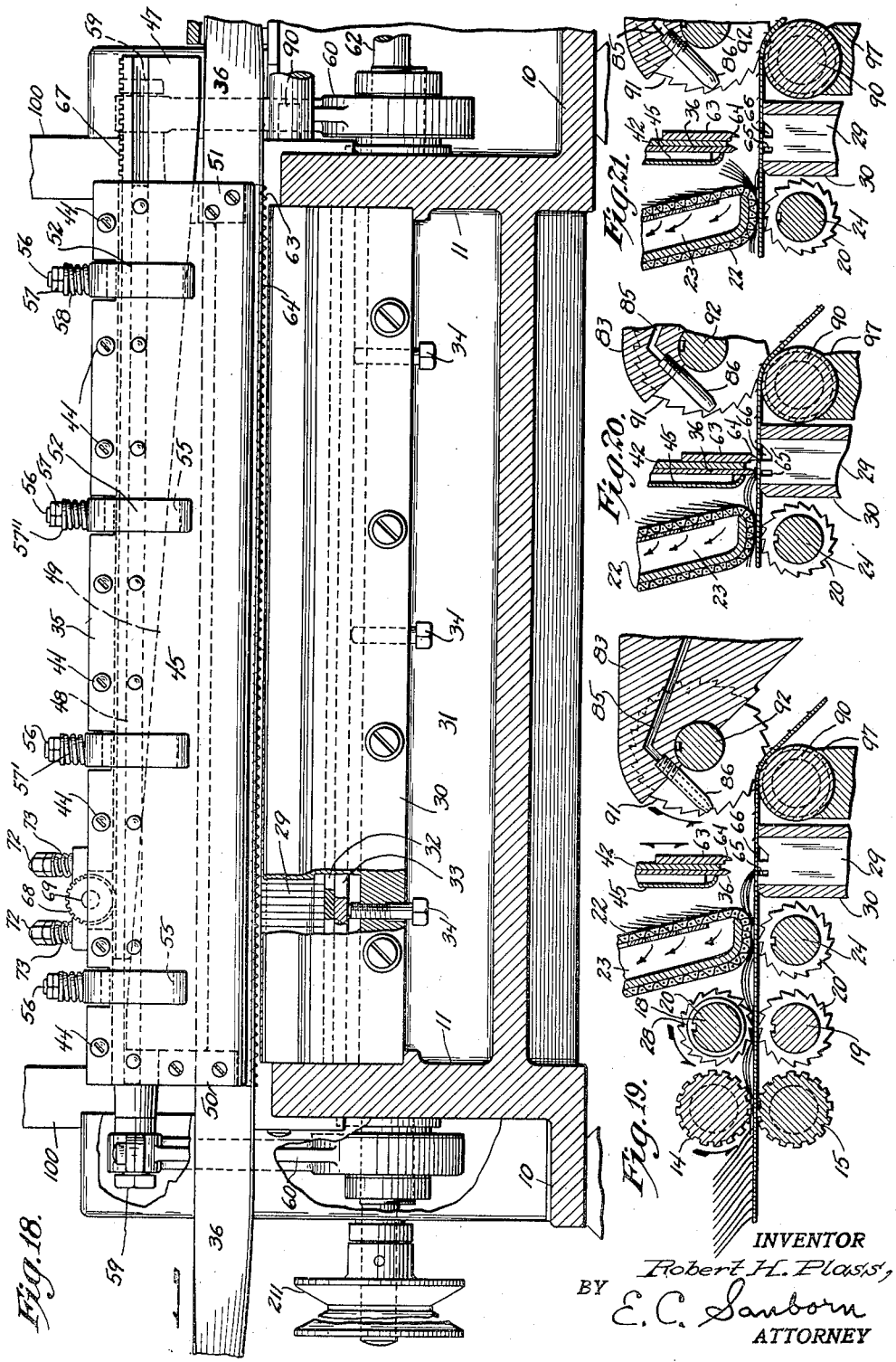

Patented Mar. 11, 1941

2,234,352

UNITED STATES PATENT OFFICE 2,234,352

DEHAIRING OF PELTS

Robert H. Plass, Upper Montclair, N. J.

Application June 30, 1937, Serial No. 151,123

55 Claims. (Cl. 149—26)

This invention relates to the dehairing of pelts or skins to produce fur useful, for example, in the manufacture of hats. The invention has for an object the removal of hair or fur from pelts or skins with marked efficiency and with a minimum of waste. One important feature of the invention comprises a novel and particularly advantageous means for severing the fur from the pelts. In this connection the invention more specifically includes a band knife arranged in a novel manner and oscillated at high speed at the cutting station while said band knife is continuously traveling through its orbit. Combined with said knife are a continuously acting sharpening means, means for compensating for sharpening wear, and means for rapidly oscillating the knife during its continuous travel.

The invention also comprises a novel cutting head through which the knife is passed, together with means for adjusting the knife with precision in relation to the pelt, without interrupting the operation of the machine.

The invention also includes a yieldably mounted support for the band knife, adapted to compensate for expansion of the knife under the heat developed during its operation, and to yield under greater than normal strains.

A further important feature of the invention resides in continuous air blast means so related to the cutting means that the severed fur is removed instantaneously from the path of the cutting means and repeated cutting of the severed fur is avoided notwithstanding high speed of oscillation of the knife. The air blast means removes the severed fur so effectively from the path of the knife that the wastage from repeated cutting of severed fur is reduced very substantially below that encountered in prior practice.

Other novel features of the invention reside in the pelt feeding means and in the means for collecting the severed fur for forming a fleece therefrom. The invention also includes dust removing means and also novel driving means with provisions for reversing the drive when desired. It additionally includes provisions for regulating the position of the suction chamber accurately with respect to the feeding and cutting means. Further features and advantages of the invention will be hereinafter described and claimed.

This application is a continuation in part of my application S. N. 745,656, filed September 27, 1934.

In the accompanying drawings:

Fig. 1 is a front elevation illustrating an embodiment of my invention.

Fig. 2 is an enlarged detail horizontal section on line 2—2 of Fig. 1, showing the band knife sharpened mechanism including driving and adjusting means, pulley 264 being omitted to show other parts more clearly.

Fig. 2A is an enlarged vertical detail section on line 2A—2A of Fig. 2.

Fig. 3 is a side elevation, as viewed from the right in Fig. 1, and showing the waste pelt conveyor in section.

Fig. 4 is a plan view of Fig. 1.

Fig. 5 is an enlarged detail vertical section on line 5—5 of Fig. 4, showing the yieldable band knife idler pulley bearing.

Fig. 6 is an enlarged transverse vertical section on line 6—6 of Fig. 4.

Fig. 7 is a side elevation as viewed from the left of Fig. 1 and showing the air pressure and vacuum apparatus.

Fig. 8 is an enlarged detail horizontal section on line 8—8 of Fig. 7, and showing the valve for controlling the air pressure to the hair blowing nozzles.

Fig. 9 is a detail elevation as viewed from line 9—9 of Fig. 8, with the supporting bracket in section.

Fig. 10 is an enlarged vertical detail section on the plane of the line 10—10 of Fig. 1.

Fig. 11 is an enlarged plan view of the gear box at the right of Fig. 1, with cover removed.

Fig. 14 is an enlarged detail front elevation of the left hand side of the hair conveyor apparatus, shown in vertical position.

Fig. 15 is a view of Fig. 14 looking from the right.

Fig. 16 is an enlarged vertical section of the upper portion of Fig. 1 on line 16—16 of the latter.

Fig. 16A is a detail view of a portion of the band knife and band knife positioner.

Fig. 17 is a horizontal section on line 17—17 of Fig. 16, showing the band knife positioner and adjusting means for the same.

Fig. 18 is a longitudinal vertical section on line 18—18 of Fig. 16, showing details of a band knife positioner and the cutting block.

Figure 12:
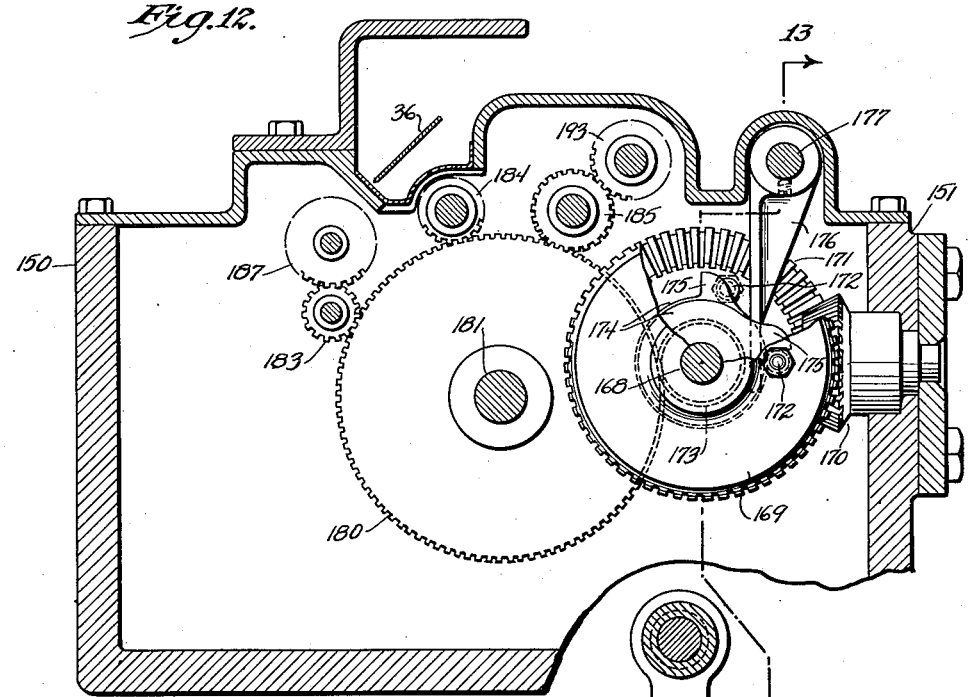
Fig. 12 is an enlarged detail vertical section on line 12—12 of Fig. 1.

Figures 19, 20, and 21, are detail sectional views illustrating the feeding, cutting, and cut-hair removing operations of the machine.

Fig. 22 is a detail view of a clamp for the cutting head.

Referring to the drawings the apparatus in which my invention is embodied is shown mounted on a suitable framework A, mounted on rubber blocks 8, 9, 9a, and 9b to cushion vibrations. The pelt feeding mechanism is positioned in the upper central portion of this framework, on a sub-frame comprising a base 10 and side walls 11, 11 (Fig. 1). The sub-frame aforesaid is bolted, as shown, to horizontal extensions 12, 12, from vertical members 13, 13 of the frame A. Between sub-frame 10 and extensions 12, 12, are rubber cushions 11a, 11a (Fig. 1), which also serve to cushion vibrations.

Pelt feeding means

The pelt feeding mechanism includes an upper feed roller 14 (Fig. 16) and a lower feed roller 15 between which the pelt is placed, with its fur side up. These rollers are solid in structure but are longitudinally corrugated or fluted, as shown, to provide projections on their periphery for improving their grip upon the pelt. Roller 14 is journalled in bearings 16 mounted for vertical sliding movement in the respective side walls 11 (see Figs. 10 and 16). Springs 17 bear upon the respective bearing elements 16 and enable the roller 14 to rise to accommodate pelts of different thicknesses, and to bear upon said pelts under the pressure exerted by said springs. The lower feed roller 15 is journaled directly in the side walls 11.

A pair of saw-toothed rollers are mounted to the rear of the rollers 14, 15 and receive the pelt therefrom. The saw-toothed rollers comprise shafts 18, 19 respectively, each of which carries a series of disks 20 having saw-shaped teeth.

Each shaft 18, 19 is provided, as shown, with a longitudinal groove or key way into which tongues from said disks are fitted, whereby the disks are firmly keyed to the respective shafts. The upper shaft 18 is journaled in bearings 21 (Fig. 10) slidably mounted in the side walls 11 and pressed downwardly by springs; while the lower shaft 19 is journalled directly in said side walls.

From the saw-toothed rollers, 18, 19, the pelt is passed between a foraminous belt 22 (which passes around the lower end of a suction chamber 23) and another saw-toothed roller mounted below said belt as shown in Figs. 16, and 19–21. The latter saw-toothed roller comprises a shaft 24 on which saw-toothed disks 20 are keyed in the same manner as noted in connection with shafts 18 and 19. Said shaft 24, like shaft 19 is journalled directly in the side walls 11.

The disks 20 on each of the shafts 19 and 24 are maintained in properly spaced relation on the respective shaft by a series of stationary spacer plates 25, mounted on rods 26, 27 which are anchored at their ends in the side walls 11. The disks 20 on shaft 18 are held in spaced relation by sleeves 28 (Fig. 19). The saw-toothed disks 20 on shaft 18 are offset axially with respect to the corresponding disks on shaft 19 so that the disks on each shaft lie in planes which fall between adjacent disks on the other shaft. Not only do the saw-shaped teeth of the disks 20 provide for an effective grip upon the pelts, which are not infrequently greasy and wet, but they prevent the pelts from slipping laterally during its travel to the cutting means.

The spacer plates 25 further exercise the important function of strippers, preventing the pelts from becoming wrapped around the saw-toothed rollers 19 and 24. Said plates 25 extend into engagement with the cutting bed box 30, and thereby insure the feeding of the pelts past said rollers and on to the cutting bed.

Cutting bed

From belt 22 and the saw-toothed roller directly under the latter, the pelt is passed on to a cutting bed comprising a series of blocks 29 (Figs. 16 and 19–21) mounted within the hollow bed element or box 30 which is secured to cross member 31 (Fig. 16) extending between the side walls 11. Blocks 29 rest at their lower ends upon a rubber base 32 which in turn seats upon a plate 33 adjustably mounted through screws 34 in the bed 30. Each of the blocks 29 is shown as L-shaped, thereby providing a lower extension which engages an inwardly projecting ledge 30' of the bed 30. The rubber base 32 provides a yieldable or resilient support for the blocks 29, and its resiliency may be regulated as desired by adjustment of the screws 34. It will be seen that the provision of the rubber base 32 enables the various blocks 29 to yield readily and to accommodate variations in thickness of different portions of the pelts.

Cutting mechanism

Above the cutting bed is positioned a cutting head 35 through which passes a band knife 36. The latter extends horizontally over a pair of feed wheels 37, 38 (Fig. 1) but is given a quarter turn to pass vertically through the cutting head 35.

Said cutting head comprises a frame including arms 39, 39 (Figs. 10, 16 and 17) journaled on a hollow shaft 40 anchored in the side walls 11. A shaft 41 is rotatably mounted in said hollow shaft 40 for a purpose which will be noted hereinafter. A plate 42, along which the band knife runs, is fastened to the cutting head frame by screws 43. Fastened to plate 42 by screws 44 (Fig. 17) is a front plate 45 (Figs. 16A, 17, and 18), said plate 45 being spaced from plate 42 by member 46 through which said screws 44 pass. A wedge block 47 (Figs. 10, 16A, and 18) is interposed between plates 45 and 42, below the spacing member 46, and is provided with a groove into which fits a strip 48 (riveted to the front plate 45) when the wedge is slipped into place between said plates. Below the wedge block 47 and between the plates 45 and 42, is wedge member 49, which is prevented from traveling to the left by block 50 (Fig. 18). It may be noted in this connection that the band knife travels to the left as viewed in Fig. 18, as indicated by the direction of the arrow. A block 51 (Fig. 18) secured to the front plate 45 takes care of the side pressure of the band knife 36 as it enters the cutting head. During its travel through said head, said band knife runs against the shoulder 49' (Fig. 16A) of the wedge 49.

In order to hold the plates 45 and 42, as well as wedges 47 and 49, in firmly assembled relation, hook clamps 52 are provided. Each of these clamps comprises a horizontal arm, having a projection 52' which bears upon a corresponding lip 53 on the head 35, and a vertical depending arm having a projection 55 engaging the front plate 45. Each horizontal clamp arm has a stud 56 (Fig. 10) passing therethrough and threaded into or otherwise secured to the cutter head frame. Between a lock nut 57 on each stud and the horizontal arm of the associated clamp is a bushing 57' having a flange 57'' (Figs. 10 and 22). A spring 58, interposed between the flange 57'' and the horizontal arm of the clamp, presses the lower end 55 of the vertical clamp arm firmly against the plate 45. Said spring also normally maintains the lower end of bushing 57' spaced slightly above the horizontal arm of the clamp. It will be seen from this arrangement that the springs 58 resist opening up of the clamps in the case of heavy shocks, and that such opening up is positively limited by the lower ends of the bushings 57'.

The cutter head arms 39, 39, are connected by pins 59, 59 with links 60, 60, journalled at their lower ends on crank portions 61 of shaft 62. The latter in turn is journalled in the side walls 11. Through said crank shaft, links 60 and pins 59, the cutter head is rapidly oscillated about the axis of shaft 41, bringing the knife 36 rapidly into and out of engagement with the pelt on the cutting bed 29 with resultant severing of the hair from the pelt as illustrated in Figures 19-21. The speed of oscillation of the cutter head is very high (about 2500 oscillations per minute being attained in practice) and the hair or fur, which is inclined rearwardly to the path of travel of the pelt, as shown in Fig. 19, is severed along closely spaced lines.

Riveted or otherwise secured to the cutter head plate 42 is a blade 63 having saw teeth 64. When the pelt is first fed under the knife 36 the teeth 64 of blade 63, as the cutter head descends, engage the end of the pelt, and particularly the small irregular pieces at the end, such as the portions of skin that covered the head or legs. Said teeth 64 thus hold the pelt firmly in cutting position. The teeth 64 also, by engaging the pelt during each stroke of the cutter head, prevent the pelt from any sidewise slippage under the action of the knife 36.

Each cutting block 29 is provided with notches 65, 66, underlying the knife 36 and blade 63 respectively. These notches receive the knife and blade when the machine is running empty, and prevent the knife and blade, under the momentum of the cutter head, from engaging the cutter blocks. Damage to the knife and blade when no pelt is in the machine is thereby obviated.

Through the wedges 47 and 49 the knife 36 may be adjusted with precision to project the desired distance beyond the cutter head. For this purpose the wedge 47 is provided on its upper edge with rack teeth 67 (Fig. 18) with which teeth a pinion 68 (Figs. 17 and 18) engages. Said pinion is secured to a shaft 69 (Fig. 17) journalled in bearings 70, 71, on the cutter head frame. Bearing 70 may, as shown, comprise an upper member through which studs 72 are passed and are threaded into the cutter head 35. Springs 73 interposed between the upper member and lock nuts on said studs, press the upper member downwardly against the shaft 69. The bearing 71 is shown as comprising a lateral extension of pivot bearing 39' of one of the arms 39; said bearing also comprising a lower plate 74 having studs 75 secured thereto and passing upwardly through the aforesaid extension. Springs 76 are interposed between said extension and lock nuts on said studs 75, and draw the plate 74 into firm engagement with the shaft 69.

Secured to shaft 69 is a worm wheel 77 which meshes with a worm 78 on the previously mentioned shaft 41 which extends through the pivot shaft 40. A hand wheel 79 is fast to shaft 41 and enables the latter to be turned readily, thereby, through shaft 69 and pinion 68, sliding the wedge 47 in the cutter head to adjust the blade 36. By turning the hand wheel 79 in such direction as to draw wedge 47 into the head 35 the knife 36 is forced further downwardly, whereby compensation may be made for any reduction in width or depth of the band knife due to wear. It will be apparent that the construction above described enables the knife to be adjusted while the machine is in operation.

Secured to one end of the hollow stationary shaft 40 is a collar 80 having a plurality of spring pressed balls 81 mounted therein and engaging pockets in a collar 82 fastened to the adjacent end of the worm shaft 41. Through the engagement of said balls in said recesses the shaft 41 is held against unintentional rotation, and wedge 47 is thereby maintained against accidental displacement. At the same time the shaft 41 can be readily turned through the handwheel 79 to shift the wedge 47 and effect the desired adjustment of the knife.

*Air blast for removing severed fur*

Mounted on and extending between the side walls 11 is a compressed air manifold 83 containing a chamber 84 and a plurality of passages 85 communicating therewith and terminating in nozzles 86. Air under pressure is continuously supplied in chamber 84 from a suitable source through pipe 87 (Fig. 17), branch pipes 88, 88, and elbows 89, 89. The nozzles 86 direct the compressed air downwardly continuously upon the pelt adjacent the knife so that the instant that the latter rises out of engagement with the pelt the severed hair or fur is blown away from the path of the knife and is received by the belt 22. The positive removal of the hair from the cutting station by the air blast from the nozzles 86 is of prime importance since it avoids undesirable waste due to recutting of severed hair, and at the same time enables the knife to effect cutting at high rates of the order indicated above.

*Pelt delivery means*

From the cutting bed 29 the pelt passes between a lower roller 90 and an upper roller comprising saw-toothed disks 91 secured by tongue and groove connection to shaft 92. Shaft 92 is journalled at its ends in bearings 93 secured in said side walls 11 by screws 94 (Figs. 10 and 11). The roller 90 is provided with circumferential grooves 95 (Fig. 11) which receive the saw teeth 91. Said roller 90 is journalled at its ends in bearing elements 96 (Fig. 10) mounted for vertical movement in the side walls 11 and is engaged intermediate said bearing elements by a scraper member 97, which is pressed against said roller by springs 98. The roller 90 is thus maintained in position to receive within its grooves the saw teeth of disks 91, but is prevented, by engagement of bearings 96 with bearings 93, from coming into contact with said teeth. The scraper 97 removes any grease which may adhere to roller 90. The disks 91 run in slots 98' (Figs. 11 and 17) in the manifold 83. The nozzles 86 extend between adjacent disks 91 (Fig. 11).

Upon passing through the rollers 90, 91, the dehaired pelts are deposited upon an endless conveyor 99 (Figs. 3, 7, and 16) whereby they are removed from the machine.

*Suction chamber and fleece forming means*

The suction chamber 23 is carried by a frame comprising arms 100, 100 (Figs. 3, 7, 10, and 16)

pivotally mounted on studs 101, 101 in the side walls 11, 11. The frame aforesaid may be secured in operative position by bolts 102 passing through openings in lips 103 on said side walls and threaded into extensions 104 on said frame. Stops 105 on said extensions normally engage ledges 106 on the tops of said side walls. When access to the interior of the machine, and particularly the feeding and cutting mechanism is desired, the nuts 102' may be removed from the bolts 102 and the frame 101 and suction chamber tilted about the pivots 101 into the dotted line position (Fig. 3). At this time, stops 107 on the frame arms 100 engage the edges of the side walls and stop the frame in the dotted line position referred to. The center of gravity of the frame and parts carried thereby is now at the right (Fig. 3) of the pivotal axis 101, so that the frame remains in said position. Slots 103' shown in dotted lines (Fig. 10) in the lips 103 permit the bolts 102 to pass out of said lips when the nuts of said bolts are removed and the frame 101 is tilted as aforesaid.

Suction chamber 23 is supported at the top by studs 108 extending through bearing elements 109 which are held slidably against the frame arms 100 by angle members 110. The latter are vertically adjustable through bolts 111 extending through lugs 112 on the frame and threaded through lips 113 of said angle members. Thus by turning of said bolts the height of the bearing elements 109, and hence of the studs 108 and suction chamber 23, may be adjusted with precision. Springs 114, mounted between blocks 115 on the angle members 110 and extension 116 of the suction chamber, maintain a constant downward pressure on the latter.

The lugs 112 above mentioned extend from brackets 117 which are secured to the frame arms 100 by screws or bolts 118, 119. The bolts 119 also pass through elongated slots 120 in the angle members 110, as shown.

Secured to suction chamber 23 at its lower end are side extensions 121. A curved end plate 122, secured between said side extensions, closes up the lower left side (Figs. 10 and 15) of the chamber, while a plate 123, provided with holes 124, extends between said extensions 121 at the right. Plate 123 terminates a short distance above the bottoms of said extensions 121, leaving an opening 125.

Studs 126 are riveted into the side plates 121 and pass through bearing elements 127 which are slidably mounted in forks 128 at the ends of arms 129 adjustably mounted on the frame extensions 104 through bolts 130 passing through said extensions and engaging elongated slots in said arms. Through said arms 129 the suction chamber may be adjusted about the axis of the studs 108 and its lower end brought to the desired distance rearwardly from the knife 36, whereupon said arms may be locked by tightening the bolts 130. Thus by said arms 129, in conjunction with vertical adjustment of the angle members 110, the lower end of the suction chamber may be located with precision in any desired relation to the knife, cutting bed, and saw toothed roller 24.

The belt 22 may be of woven wire or other suitable foraminous material. This belt is driven by rubber rollers 131, 132, the shafts of which rollers are journalled in bearing members 133, 134, slidable vertically in the frame arms 100. As illustrated in Fig. 15, each bearing member 134 bears at one side against an extension 135 of the corresponding frame arm 100, and at the opposite side against a bar 136 vertically adjustable through bolt 137 which bears against the top of bracket 117. Each bearing member 133 for roller 131 bears at one side against said extension 135 and at a portion of its opposite side against said bar 136, the remainder of the opposite side of said bearing member 133 engaging the adjacent bracket 117. A stud 138 extends from each bearing member 133 into the adjacent slidable bar 136, whereby, through adjustment of said bars, said bearing members, together with bearings 134 may be adjusted, and rollers 131 and 132 raised or lowered as desired, to adjust said rollers for any variations in length of the screen 22. Springs 139 press downwardly upon bearings 134 and maintain gripping pressure between rollers 131 and 132. Guide 140, extending forwardly from extensions 104 and between the same, maintains the wire belt 22 against the lower portion of the suction chamber, and prevents said belt from engaging the saw teeth of roller 24.

Extending between and secured to the frame arms 100 is a bracket 141 which has secured thereto a plate 142 having a polished surface and extending opposite the forward run of the belt 22 as shown. At its top the plate 142 is bent to form a downwardly and forwardly extending portion 143 (Figs. 15 and 16). Secured to the lower end of plate 142 and depending therefrom is a spring plate 144 which at its lower end bears against the cutter head plate 45. Plate 144 prevents any air passing into the suction chamber 23 from above the knife 36. The interior of the suction chamber 23 is connected to a suitable suction source hereinafter described.

From the construction hereinbefore described, it will be seen that each pelt is introduced between the grooved rollers 14, 15, furred side up, and is passed from said rollers to the saw-toothed rollers 19, 20. From the latter, the pelt is passed between the saw-toothed roller 24 and the wire belt 22. As has been noted, the spacers 25, in addition to spacing the saw teeth of rollers 19 and 24, serve also as guides or strippers so that the forward end of the skin does not run in between said rollers, or become wrapped therearound, and cause the machine to choke. The suction chamber is set so that the belt 22, in passing around the lower end of said chamber, engages the pelt and presses it downwardly firmly against the saw teeth of roller 24. From belt 22 and roller 24 the pelt is passed on to the cutting blocks 29 beneath the knife 36 and saw-toothed blade 63. The latter engages the pelt with each down stroke of the knife, as previously noted, and insures that the pelt is held steady during cutting of the hair. In each down stroke the knife 36 severs a layer of hair from the pelt, and, as said knife rises from each cutting stroke the hair severed thereby from the pelt is blown instantly out of the path of the knife by the continuous air blast from the nozzles 86. The hair removed from the cutting zone by said air blast is blown thereby against the screen 22 (see Fig. 21) and is held against said screen by the strong suction through the opening 125. As the screen travels upwardly along the front of the suction chamber the hair or fur is maintained thereon by the suction through the holes 124. As the hair passes beyond the holes 124 it is brought into engagement with the spring plate 144, which presses the hair against the screen, and the hair, during its further upward travel, is pressed between the screen and the plate 142, whereby a continuous fleece is formed. It may be noted in this connection that, as shown in Fig. 16, the distance between belt 22 and plate 142 diminishes slightly as the fleece travels upwardly with said belt. The fleece thence passes over the bend at the top of the plate 142 and down on to the forwardly extending portion 143 of said plate, such passage of the fleece being assisted by the corrugated roller 146 driven in unison with roller 131. From the plate portion 143 the continuous fleece passes on to the belt conveyor 147 (Fig. 16), whence it is removed to a suitable collecting point.

Holes 143' (Figs. 10 and 16) in plate 143 permit any small bits of pelt to pass through and to drop on to the inclined plate 141', whence they pass downwardly to the pelt discharge belt 99.

It will be seen that in each downward stroke the knife 36 cuts across the pelt along a line spaced slightly from that of the succeeding stroke, and severs the adjacent hair or fur filaments close to the bases or roots thereof, the continuous blast from the nozzles 86 instantly removing the severed fur as the knife rises from each stroke. The oscillations or reciprocations of the knife may be effected with marked rapidity. For example, in machines embodying my invention there are attained in practice about 2500 oscillations per minute while the knife is travelling longitudinally at a speed of about 600 feet per minute. Notwithstanding such speeds, the continuous air blast referred to removes the severed fur so effectively that the waste from repeated cutting of such fur is reduced very materially below that occurring in prior practice.

The corrugated roller 146 is mounted in links 131', 131' pivoted on the shaft of roller 131 and resting upon the bend of plate 142, as shown in Figures 15 and 16. The shaft of said roller 146 is journalled in bosses 146', 146' integral with said links. Connected to extensions of said bosses 146', 146' are springs 146'', 146'', (Figures 3, 4, 15 and 16), which at their other ends are hooked to lips on the frame arms 100. Said springs maintain the corrugated roller 146 at a substantially constant distance from the screen 22, as well as from the bend of plate 142, despite adjustments of the height of roller 131.

The speeds of the feed rollers 14, 15, 18, 19, and 24, and of the wire belt 22, are such that the cutting of the fur from the skin does not disturb the position of the layers of hair with respect to each other, and the fleece comes out of the machine in substantially the same shape as when it entered the machine attached to the skin.

*Driving mechanism*

The drive shaft 62 previously mentioned is journalled in the side walls 11 and also in a wall 149 which extends between frame pieces 150, 151 integral with or secured to the right hand side wall 11 (Fig. 11). Near its right hand end said shaft 62 has secured thereto a worm 152 which meshes with a worm wheel 153 fastened on a cross-shaft 154. The latter is journalled in bearings 155, 156, secured to the frame members 150, 151, respectively. At one end said shaft 154 has fast thereto a sprocket wheel 157 (Figs. 1 and 4) whereby, through chain 158 and sprocket 159 it drives the band knife pulley 38.

Figure 13:
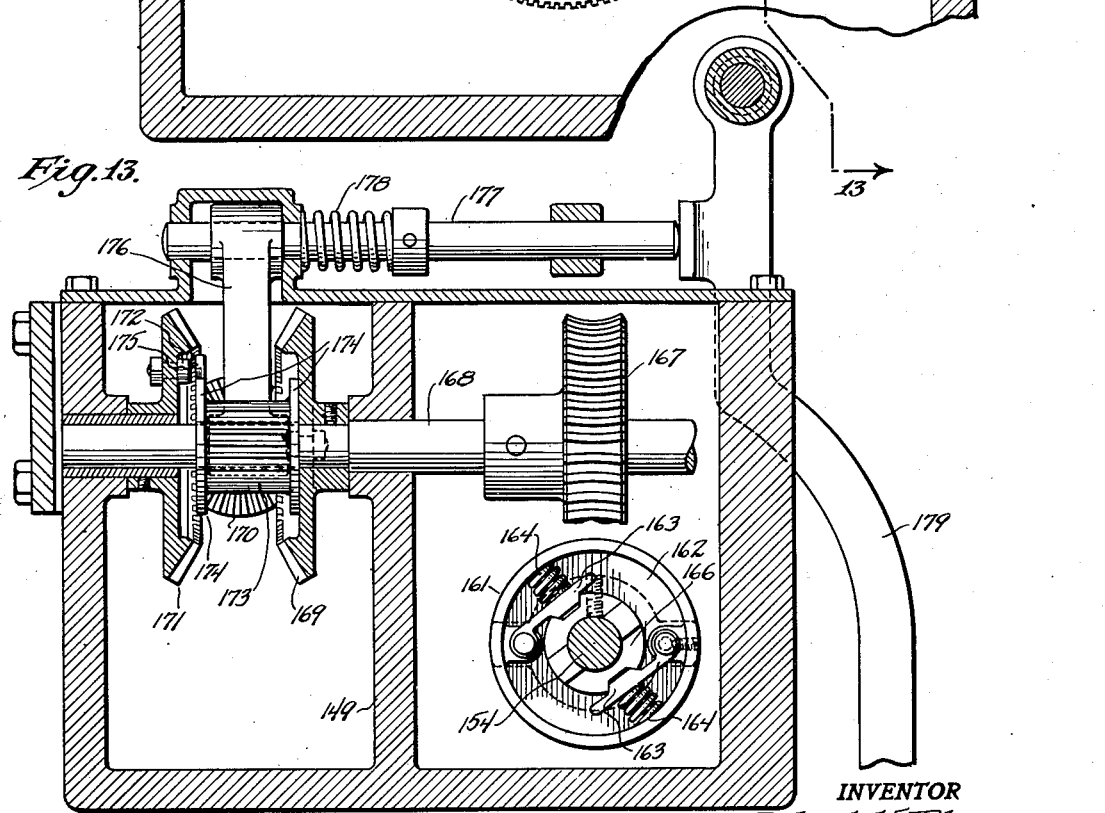
Fig. 13 is a vertical section on line 13—13 of Figures 11 and 12.

Near its other end, the shaft 154 has loosely mounted thereon a worm 160, driven from said shaft through a safety clutch 161. The latter comprises a housing 162 (Fig. 13) secured to shaft 154 and carrying a pair of pivoted pawls 163, 163 urged by springs 164, 164 into engagement with notches in a hub member 166 integral with the worm 160. Rotation of shaft 154 thus normally drives said worm 160, but in the event of overload the clutch pawls will slip out of engagement with the notches in the hub 166, disrupting said drive.

The worm 160 drives a worm-wheel 167 (Figs. 11 and 13) secured to reversing gear shaft 168. Fast to said shaft 168 near one end thereof is a bevel gear 169 which engages the idler bevel pinion 170 and thereby drives reversely the bevel gear 171. Each of the bevel gears 169, 171, is recessed, as shown, and carries within its recess a stud 172. Between said bevel gears, and loose on shaft 168, is a pinion 173 having a pair of end flanges 174, 174 welded thereto or integral therewith, each of said flanges having a nose 175 projecting therefrom. Extending between said flanges is an arm 176 secured to a slidably mounted rod 177. Through a spring 178 the rod 177 is normally maintained to the right (Fig. 13) in which position the nose 175 of the right hand disk 174 is in the path of pin 172 on gear 169, as a result of which the pinion 173 is driven by said gear 169. When rotation of pinion 173 in the opposite direction is desired, the shaft 177 is shifted to the left, by operation of hand lever 179 (Fig. 13), whereby the nose 175 of the right hand flange 174 is carried out of the path of pin 172 of gear 169, and nose 175 of the left hand flange 174 is brought into the path of pin 172 on gear 171.

Pinion 173 drives master gear 180 (Figs. 11 and 12) fast on shaft 181 which has also keyed to one end thereof the sub-master gear 182 (Fig. 11). Master gear 180 drives pinions 183, 184, and 185. Pinion 185, through a coupling 186, drives the lower feed roller 15. Said pinion 185 meshes with a pinion 193 which in turn drives the upper feed roller 14 through a pair of universal joints 188, 188. Pinion 184 drives the lower saw roller shaft 24; while pinion 183 (Fig. 12) through universal joints 189, 189 (Fig. 11) drives the lower delivery roller 90.

A pinion 190 (Fig. 3) meshing with the sub-master gear 182, drives the lower saw roller shaft 19. Meshing with pinion 190 is a pinion 191 (Fig. 11) which drives the upper saw roller shaft 18 through universal joints 192, 192.

Pinion 187 (Fig. 12), which meshes with pinion 183, drives the saw tooth delivery roller 92 through universal joints 194, 194.

Secured to the left hand end portion of shaft 168 (Fig. 11) is a bevel pinion 195, which meshes with a similar bevel pinion 196. The latter is fast to a shaft 197 (Figs. 1 and 3) which is connected through universal joint 198 with shaft 199 journaled in bearing 200 extending from one of the side frames 100. Shaft 199 at its upper end carries bevel pinion 201 which meshes with bevel gear 202 secured to the shaft of the screen feed roller 131. Roller 132 in turn is driven by gear 203 fast on the shaft of roller 131, meshing with gear 204 secured to the shaft of said roller 132.

Corrugated roller 146 is driven from roller 131 through sprockets 205, 206 and chain 207.

The fleece conveyor 147 passes over rollers 2 and 3 (Figs. 3, 4, and 16) and is driven from roller 131 by a pulley 4 on the shaft of said roller, a belt 5, and a pulley 6 on the shaft of roller 3. The upper run of the conveyor 147 may be supported on cross bars 147' (Figs. 3 and 7). Angle irons 7, 7, secured to said cross bars, extend upwardly at the sides of the upper run of said conveyor to maintain the fleece thereon.

It will be noted that through the provision of the reversing lever 179 and associated parts for shifting the pinion 173 to reverse the drive of master gear 180, the pelt feeding and delivery rollers may be driven reversely to feed the pelts out of the machine. In practice pelts are sometimes encountered which are soaking wet or otherwise in such condition as may choke the machine. The latter may further be choked by the presence of bones or of too much grease on the pelts. Under such conditions the clutch 161 slips and the forward drive of the pelt feeding means is stopped. By then shifting the lever 179 to position for reversing the drive, the feeding and delivery rollers are driven reversely and the pelt which has blocked the machine is backed out therefrom.

Shaft 62 is driven from a main drive shaft 208 (Figs. 4 and 7) through pulley 209 on the latter, belt 210, and pulley 211 on shaft 62. Shaft 208 in turn may be driven from any suitable source of power through belt 212. The latter is shown engaging idler pulley 213 on said shaft 208, but when it is desired to set the machine in operation the belt 212 is shifted from idler pulley 213 to pulley 214, which is keyed or otherwise secured to said shaft 208. The shifting of belt 212 from pulley 213 to pulley 214 and vice versa, may be effected through a conventional belt shifting hand lever such as illustrated at 215. Lever 215 may be maintained in either of its positions of adjustment by means of a notched lever 215' (Fig. 1) drawn by spring 215" into engagement with lever 215.

Band knife mounting

As previously noted, the endless band knife 36 is carried by a pair of pulleys 37, 38. Pulley 38, driven as hereinbefore noted, by chain 158 and sprocket 159, is fast on shaft 216, which is journaled in bearing 217 secured to bracket 218 extending from the main frame A. Sprocket 159 is secured to the opposite end of said shaft 216.

Projecting from the end of frame A opposite to that which carries bracket 218 is another bracket 219 on which is mounted the bearing 220 for the idler pulley 37 over which the band knife passes. The mounting for bearing 220 comprises a plate 221 secured by screws 222 to bracket 219. Slidable on plate 221 is a bearing plate 223, having side flanges 224 which extend downwardly in engagement with the sides of plate 221. Blocks 225 secured to said flanges 224, engage beneath plate 221 and retain the bearing plate 223 slidably thereon.

Bearing 220, in which is journalled shaft 37' of pulley 37, is pivotally connected to plate 223 by the vertical pivot pin 226. Set screws 227, threaded through extensions 228 of plate 223, engage opposite sides of a projection 229 of the bearing 220, whereby said bearing may be adjusted with precision about the pivot pin 226. When in the desired position of adjustment, the bearing 220 may be locked therein by cap screws 230. The latter pass through wings 231, extending laterally from bearing 220, and thence into the plate 223.

The bearing 217 is preferably also mounted for adjustment about a vertical pivot pin, in a manner similar to that described above in connection with bearing 220. Said bearing 217 is shown connected by pivot pin 232 to plate 233, which is secured to bracket 218. Through set screws, one of which is shown at 234, arranged in the same manner as described above, the bearing 217 may be adjusted as desired about pin 232. When in the desired position, said bearing may be locked therein by cap screws (see Fig. 4) in the same manner as set forth above in conjunction with bearing 220.

The adjustment of the bearings 217 and 220 about the vertical axes of pins 232, 226, enables the pulleys 37, 38 to be accurately positioned so that the band knife will run true and will be properly aligned with the cutter head 35.

As pointed out above, the plate 223 on which bearing 220 is mounted is slidable on plate 221. Threaded into said plate 223 is a bolt 235, which projects through an opening in a bracket 236 fastened to plate 221. A spring 237, interposed between bracket 236 and washer 238 on said bolt, normally holds the bearing plate 223 and bearing 220 in the position shown in Figures 4 and 5, maintaining the band knife 36 under tension. The band knife is stretched tightly between the pulleys 37, 38, and, as previously noted, is given a quarter turn in its upper crossing as it enters the cutting head, so that its cutting edge is turned into downward position. As it leaves the cutting head, the knife resumes its horizontal position. The spring 237 is of sufficient strength to retain the pulley 37 in its left hand position (shown in Figures 4 and 5) during the downward strokes of the knife and cutter head in normal operation, the knife being further tensioned between said pulleys in each down stroke thereof, and springing back into raised position as the cutter head rises. At the same time, the spring 237 enables the pulley 37 to move slightly to the right under greater than normal strains, and to relieve excessive tension in the knife 36.

It may be additionally noted that the spring 237 performs the further function of maintaining the knife 36 under tension despite expansion of the knife under the heat developed in its operation.

Surrounding the spring 237 is a sleeve 239, which is loosely positioned between washer 238 and bracket 236. Said sleeve is fitted sufficiently closely to prevent the spring from contracting to such extent under a sudden excessive pull on the band knife as to cause the knife to jump off the pulley.

Band knife sharpening means

Secured to the frame A by studs 240 are a pair of upper and lower angle irons 241 and 242, respectively. Between these angle irons and secured thereto are hardened steel plates 243, 243 (Fig. 2A). Spacers 244 are positioned between said angle irons, the latter being secured together by bolts 245 passing through said spacers. The plates 243 engage opposite sides of the band knife 36 to hold the latter closely for grinding. An arm 246, fastened to the lower angle iron 242, carries a roller 247 which serves as a guide for the knife.

Beyond the angle irons 241, 242, the knife passes below the cross-piece 248 of the frame A. An angle iron 249 secured to said cross-piece extends in front of and below said knife and forms a guard therefor. A roller 250, mounted on arm 251 fastened to the guard 249, guides the knife in its travel past said guard.

A pair of bell-crank levers 252, 252 (Fig. 2A), pivoted at 252', 252' on frame bracket 253, carry a pair of grinding wheels 254, 254, which pass through openings 255 (Fig. 2) in the angle irons 241, 242, and engage opposite sides of the knife during its travel. Pivotally connected to the levers 252, 252 are rods 256, 256 which extend through bearings 257, 257 pivoted at 258, 258, on arms 259, 259 projecting from the frame piece 253. Said rods 256, 256 have threaded ends which pass through nuts 260, 260. Springs 261, 261, constantly force the rods 256, 256 inwardly and maintain the nuts 260 in contact with the bearings 257, 257, as shown in Fig. 2A. By turning said nuts the grinding wheels 254, 254 may be adjusted with precision to effect the desired engagement with the knife.

The wheels 254, 254 are continuously driven from shaft 208 through pulley 262 (Figs. 3 and 4) and belt 263. The latter passes from said pulley 262 over idler pulley 264 (Figs. 1 and 2A), thence over pulley 265 (Figs. 2 and 2A) secured or integral with the upper grinding wheel 254, thence around pulley 266 integral with or secured to the lower grinding wheel 254, and thence over idler pulley 267 and back to pulley 262. Idler pulley 264 is mounted on an arm 268 pivoted on frame bracket 253, whereby said arm and pulley may be adjusted to take up slack in belt 263. Said arm and pulley may be locked in adjusted position by tightening nut 269' on bolt 269 which extends through arcuate slot 270 in the bracket 253.

It will be seen from the foregoing construction that the grinding wheels 254, 254 continuously sharpen the band knife during its travels through the angle irons 241, 242; and that, through the nuts 260, said wheels may be adjusted as desired with respect to said knife without interrupting the operation of the machine.

Provision is also made for horizontal adjustment of the grinding wheel carrying frame 253. For this purpose a bolt 253' (Figs. 2 and 2A) extends through a slot 13" in a bracket 13' integral with frame member 13, said bolt thence passing into the upper rear portion of the frame 253. In its lower rear portion the frame 253 carries a block 286 (Fig. 2A) which is slidably mounted on a pin 287 projecting from frame A, and is clamped in position on said pin by set screw 288. It will be apparent that by loosening the set screw 288 and the nut of bolt 253' the frame 253, together with the grinding wheels carried thereby, may be adjusted horizontally with respect to frame A and member 13 and may then be locked in adjusted position by tightening said nut and set screw.

Ventilating means

A fan 272 in casing 273 (Figs. 1, 4 and 7) is driven by a belt 274 from pulley 275 on shaft 208, said belt passing over pulley 276 on the shaft of said fan. At its suction end, the fan casing 273 is connected, by conduit 277 with suction chamber 23 to maintain suction continuously therein.

At its exhaust end, the fan casing 273 is connected, by conduit 278, with air box 279. A blade or valve 280 in said box 279 divides the exhaust current, one part passing upwardly through conduit 281 to the atmosphere, and the other part passing through conduit 282 to blow nozzle 283. From the latter the air blast passes under the machine, past shield 284, as indicated by the arrows in Fig. 7, thereby blowing any dust developing beneath the machine into the screened dust chamber 285.

For regulating the amount of air passing from the fan 272 to the conduit 282 and blow nozzle 283, the blade 280 is pivotally mounted in the casing 279 by trunnion 290 integral with the vane and extending beyond the edges thereof into recesses in the casing 279. A handle 291, integral with trunnion 290 and extending outside the casing 279 affords convenient means for adjusting the position of the blade 280 as desired. The blade may be secured in any of its positions of adjustment by any suitable means, such as a clamp 292 having an extension 292' recessed to fit the curved surface of the trunnion 290, and also having an extension 292" engageable with the casing 279. After the handle 280 is manipulated to set the blade in its desired position, a bolt 293 is passed through the clamp 292 and thence into the casing 279 for firmly locking the clamp 292 against trunnion 290 and thereby maintaining the blade 280 firmly in its position.

Summary

The operation of the machine will be evident from the foregoing description. Briefly summarizing, it may be pointed out that pelts are placed by an operator, furred side up, on a suitable platform 286 (Fig. 16) and are inserted between the first pair of feed rollers 14, 15. Thence they are fed by said rollers 14, 15 to the saw-toothed rollers 18, 19, and thence between saw-toothed roller 20 and screen belt 22 on to the cutting bed comprising yieldably mounted blocks 29. Meanwhile the cutter head 35 is rapidly oscillated, carrying the band knife 36 into and out of cutting position, said knife severing the fur from each pelt along closely spaced transverse lines. The instant that the knife rises from each cutting stroke, the continuous air blast emanating from nozzles 86 blows the severed fur out of the path of said knife. The severed fur is received by the screen belt 22 on which it is retained by the suction from suction chamber 23. As said belt 22 carries the fur upwardly beyond the range of the suction in chamber 23, the fur is maintained in engagement with said belt by the plate 142. Thence the severed fur, in the form of a fleece, is passed around the bend of plate 142, assisted by roller 146, and passes downwardly along portion 143 of said plate and on to conveyor 147 which removes said fleece from the machine.

The pelts from which the fur has been severed are removed by the delivery rollers 90, 91 and pass therefrom on to a suitable conveyor 99, driven by any suitable power source, which removes said pelts. The band knife 36, oscillated at high speed by cutter head 35 during the longitudinal travel of said knife over pulleys 37, 38, is continuously sharpened by the grinder wheels 254, 254, which may be adjusted as desired without interrupting the travel of said knife. The knife may also be adjusted in the cutter head 35 as previously noted, without interrupting the operation. The yieldably mounted bearing 220 for pulley 37, under the action of spring 237, takes up any slack in the knife which may develop from expansion thereof under the heat arising from its operation.

Should the machine become jammed for any reason, such as by the wet or greasy condition of a pelt, or the presence of foreign material, the clutch 161 slips and avoids damage to the machine. The operation of the feed rollers may then be readily reversed by operation of the hand lever 179, whereupon the pelt which caused the blocking is backed out of the machine. In the meantime, suction is maintained in the chamber 23 by the fan in the casing 273, which fan also blows a current of air through pipe 282 and nozzle 283 into the space within the machine frame below the pelt feeding and fur severing section, said air blast following the path of the arrows shown in Fig. 7, and blowing any dust into the screened dust collecting chamber 285. The intensity of this current may be regulated by operation of the valve 280 (Figs. 8 and 9).

Through the bolts 111 and angle members 110 the suction chamber 23 may be adjusted vertically, while through arms 129 said chamber may be adjusted about the axis of stubs 108. Thus the lower end of said chamber may be brought with precision into any desired relation to the knife, cutting bed, and saw-toothed roller 24. Also the screen belt rollers 131, 132 may be adjusted through bars 136 and bolts 137, to compensate for any variations in the length of screen 22.

It will be apparent that while the band knife construction and arrangement herein disclosed is of special utility in conjunction with the severing of fur from pelts fed to the knife as previously described, nevertheless the utility of this band knife arrangement is not restricted to this field, and that said band knife may be used for other purposes.

The terms and expressions which I have employed are used as terms of description and not of limitation, and I have no intention in the use of such terms and expressions, of excluding any equivalents of the features shown and described or portions thereof, but recognize that various modifications are possible within the scope of the invention claimed.

I claim:

1. The method of cutting, comprising moving a band knife in an endless path, turning a portion of said knife at an angle to the remaining portion during said travel, and vibrating said turned portion into and out of cutting position.

2. In combination a band knife, means supporting said knife for travel in an endless path, means for causing a portion of said knife to be turned at an angle to the remaining portion of said knife during said travel, and means for vibrating said turned portion into and out of cutting position.

3. In combination, a band knife, elements supporting said knife for travel in an endless path, said band knife having a portion between said elements turned at an angle to the remaining portion of said knife, and means for oscillating the first mentioned portion into and out of cutting position during the travel of said knife.

4. In combination, a band knife, elements supporting said knife for travel in an endless path, means for turning a portion of said knife into a position at an angle to the remaining portion during the travel of said knife, and means for actuating the first mentioned means for shifting the first mentioned portion of said knife into and out of cutting position during said travel.

5. In combination, a band knife, elements supporting said knife for travel in an endless path, means for imparting a turn of substantially ninety degrees to a portion of said knife between said elements during the travel of said knife, and means for shifting said turned portion into and out of cutting position transversely to said path during said travel.

6. The method of cutting, comprising moving a band knife in an endless path over a plurality of supporting elements, turning a portion of said knife between said elements into a position at an angle to the remaining portion of said knife, forcing said turned portion of said knife between said elements into cutting position thereby tensioning the knife portion between said elements, and releasing said tensioned portion for retraction from cutting position by virtue of the energy stored therein.

7. In combination, a band knife, means comprising rotatable elements for supporting said knife for travel in an endless path, means engageable with a portion of said knife between said elements for vibrating said knife portion toward and away from the axes of rotation of said elements for thereby shifting said knife portion into and out of cutting position during the travel of said knife.

8. The method of cutting which comprises moving a band knife in an endless path over a plurality of rotatable elements, and vibrating a portion of said knife toward and away from the axes of rotation of said elements to thereby shift said portion into and out of cutting position during the travel of said knife.

9. In combination, a band knife, means for causing said knife to travel in an endless path, means adjacent a portion of said path for receiving a portion of said knife and oscillating the same into and out of cutting position with respect to another portion of said knife during the travel of said knife, and means for adjusting the position of said knife portion in said receiving means.

10. In combination, a band knife, means for causing said knife to travel in an endless path, means adjacent a portion of said path for receiving a portion of said knife and oscillating the same with respect to another portion of said knife into and out of cutting position during the travel of said knife, and means for adjusting the position of said knife portion in said receiving means during the travel of said knife.

11. In combination, a band knife, means for causing said knife to travel in an endless path, means adjacent a portion of said path for receiving a portion of said knife and vibrating the same into and out of cutting position with respect to another portion of said knife during the travel of said knife, and wedge means for adjusting the position of said knife portion in said receiving means during the travel of said knife.

12. In combination, a band knife, means for causing said knife to travel in an endless path, means adjacent a portion of said path for receiving a portion of said knife and vibrating the same into and out of cutting position with respect to another portion of said knife during the travel of said knife, means for adjusting the position of said knife portion in said receiving means during the travel of said knife, and means for sharpening said knife during the travel thereof.

13. In combination, a band knife, means for causing said band knife to travel in a given path, means for vibrating only a portion of said knife transversely of its path of travel to effect cutting, and means responsive to increase in length of said knife for taking up slack therein.

14. In combination, a band knife, means for causing said band knife to travel in a given path, means for vibrating only a portion of said knife transversely of its path of travel to effect cutting, means for sharpening said knife during said travel, and means responsive to increase in length of said knife for taking up slack therein.

15. In apparatus for cutting fur from pelts, means for feeding pelts along a given path, a band knife, means for causing said knife to travel in an endless path, and means for vibrating only a portion of said knife transversely of its path of travel for severing fur from said pelts.

16. In apparatus for cutting fur from pelts, means for feeding pelts along a given path, a band knife, means for causing said knife to travel in an endless path, means adjacent the path of said pelts for receiving said knife and actuating only a portion of the latter with respect to its path of travel for severing fur from said pelts, and means cooperating with said receiving means for regulating the distance between said knife and a pelt during the operation of said knife.

17. In apparatus for cutting fur from pelts, means for feeding pelts along a given path, a band knife, means for causing said knife to travel in an endless path, means adjacent the path of said pelts for receiving said knife and vibrating only a portion of the latter transversely of its path of travel for severing fur from said pelts, and means for sharpening said knife during the travel thereof.

18. In apparatus for cutting fur from pelts, means for feeding pelts along a given path, a band knife, means for causing said knife to travel in an endless path, means adjacent the path of said pelts for receiving said knife and actuating only a portion of the latter with respect to its path of travel for severing fur from said pelts, means for sharpening said knife during the travel thereof, and means cooperating with said receiving means for regulating the distance between said knife and a pelt during the operation of said knife.

19. In apparatus for cutting fur from pelts, means for feeding pelts along a given path, a band knife, means for causing said knife to travel in an endless path, means for actuating a portion of said knife transversely of its path of travel for severing fur from said pelts, and air blast means for removing severed fur from the path of said knife.

20. In apparatus for cutting fur from pelts, means for feeding pelts along a given path, a band knife, means for causing said knife to travel in an endless path, means for actuating a portion of said knife transversely of its path of travel for severing fur from said pelts, and air blast means for removing severed fur from the path of said knife, and suction means for receiving the severed fur.

21. In apparatus for cutting fur from pelts, means for feeding pelts along a given path, a band knife, means for causing said knife to travel in an endless path, and means for vibrating only a portion of said knife transversely of its path of travel to sever fur from each pelt along successive lines transverse to the direction of travel of said pelt.

22. In apparatus for cutting fur from pelts, means for feeding pelts along a given path, a band knife, means for causing said knife to travel in an endless path, means for actuating a portion of said knife transversely of its path of travel to sever fur from each pelt along successive lines transverse to the direction of travel of said pelt, and means for directing a continuous blast of air upon the pelt adjacent said knife to remove severed fur from the path of said knife.

23. In combination, a band knife, means for causing said knife to travel in an endless path, means adjacent a portion of said path for vibrating only a portion of said knife transversely of said path into and out of cutting position, means adjacent another portion of said path for sharpening said knife during the travel thereof, and means for varying the position of said sharpening means with respect to said knife during said travel.

24. In apparatus for cutting fur from pelts, fur severing means, means comprising a foraminous belt for receiving and removing severed fur, and means including said belt and a roller therebelow for receiving pelts therebetween and feeding said pelts toward said severing means.

25. In apparatus for cutting fur from pelts, fur severing means, means comprising a foraminous belt for receiving and removing severed fur, means including said belt and a roller therebelow for receiving pelts therebetween and feeding said pelts toward said severing means, and means for varying the position of said belt with respect to said roller.

26. In apparatus for cutting fur from pelts, fur severing means, means comprising a foraminous belt for receiving and removing severed fur, and means including said belt and a roller therebelow for receiving pelts therebetween and feeding said pelts toward said severing means, said roller having saw-shaped teeth.

27. In apparatus for cutting fur from pelts, fur severing means, and means for feeding said pelts to said severing means, said feeding means comprising a pair of saw-toothed rollers rotatable about axes displaced along the path of travel of the pelt and stripper means common to said rollers for preventing wrapping of the pelts around said rollers.

28. In apparatus for cutting fur from pelts, fur severing means, and means for feeding said pelts to said severing means, said feeding means comprising a pair of corrugated rollers, a pair of saw-toothed rollers for receiving the pelts from the corrugated rollers, and means comprising a third saw-toothed roller and a foraminous belt thereabove for receiving the pelts from said pair of saw-toothed rollers.

29. In combination, a band knife, means supporting said band knife, the plane of said band knife extending horizontally over said supporting means, an intermediate portion of said knife extending in a plane at an angle to the horizontal, a cutting head receiving said intermediate portion, means for imparting longitudinal travel to said knife, and means for actuating said cutting head transversely to said longitudinal travel.

30. In apparatus for cutting fur from pelts, means for feeding pelts along a given path, fur severing means, means for impelling said severing means into and out of position for cutting fur from a pelt, and means movable into engagement with the pelt with each cutting stroke of said severing means for insuring retention of the pelt in cutting position.

31. In apparatus for cutting fur from pelts, means for feeding pelts along a given path, fur severing means, means for impelling said severing means into and out of position for cutting fur from a pelt, means movable into engagement with the pelt with each cutting stroke of said severing means for insuring retention of the pelt in cutting position, a cutting bed beneath said severing and retaining means, said bed having notches adapted to receive said severing and retaining means in the event of operation while no pelt is on said cutting bed.

32. In apparatus for cutting fur from pelts, means for feeding pelts along a given path, a knife, means for imparting cutting strokes to said knife to sever fur from said pelt concurrently with travel of said knife transversely of said pelt, and means engageable with the pelt with each cutting stroke of said knife to insure retention of said pelt in cutting position.

33. In apparatus for cutting fur from pelts, means for feeding pelts along a given rectilinear path, fur severing means comprising a band knife, means for causing said band knife to travel longitudinally in a path transversely to said path of said pelts, and means for actuating a portion of said knife transversely to the path of travel of said knife to sever fur from said pelts.

34. In combination, a band knife, means for causing said knife to travel longitudinally, a cutter head for receiving said knife, means for actuating said cutter head to impart cutting strokes to said knife transversely of its direction of travel, said cutter head comprising a frame, a plate carried by said frame and extending over a portion of said knife, and yieldable clamping means on said frame engaging said plate for maintaining the latter in position for guiding said knife.

35. In combination, a band knife, means for causing said knife to travel longitudinally, a cutter head for receiving said knife, means for actuating said cutter head to impart cutting strokes to said knife transversely of its direction of travel, said cutter head comprising a frame, an element carried by said frame and engaging said knife, and means for shifting said element to adjust said knife with respect to said head during the longitudinal travel of said knife.

36. In combination, a band knife, means for causing said knife to travel longitudinally, a cutter head for receiving said knife, means for actuating said cutter head to impart cutting strokes to said knife transversely of its direction of travel, said cutter head comprising a frame, an element carried by said frame and engaging said knife, means for shifting said element to adjust said knife with respect to said head during the longitudinal travel of said knife, and means retaining said adjusting means against accidental displacement.

37. In combination, a band knife, means for causing said knife to travel longitudinally, a cutter head for receiving said knife, means for actuating said cutter head about an axis to impart cutting strokes to said knife transversely of its direction of travel, shiftable means in said head engaged by said knife, and means concentric with said axis and operable to effect shifting of said shiftable means to adjust said knife with respect to said head during the travel of said knife.

38. In apparatus for cutting fur from pelts, fur severing means, means at one side of said severing means for feeding pelts thereto, and means at the opposite side of said severing means for removing the pelts, said removing means comprising a saw-toothed roller and a roller provided with circumferential grooves opposite the teeth of the first mentioned roller.

39. In apparatus for cutting fur from pelts, fur severing means, means for feeding pelts to said severing means, means extending adjacent said severing means for receiving severed fur and removing the same, said last-mentioned means being so constructed and arranged as to be shifted to a position whereby access is afforded to said severing means.

40. In apparatus for cutting fur from pelts, fur severing means, means for feeding pelts to said severing means, means extending adjacent said severing means for receiving and removing severed fur, said last mentioned means being pivotally mounted and adapted to be swung into a position wherein access is afforded to said severing means.

41. In apparatus for cutting fur from pelts, fur severing means, means for feeding pelts to said severing means, means extending adjacent said severing means for receiving and removing severed fur, said last mentioned means being pivotally mounted and adapted to be swung into a position wherein access is afforded to said severing and feeding means.

42. In apparatus for cutting fur from pelts, fur severing means, means for feeding pelts to said severing means, means extending adjacent said severing means for receiving and removing severed fur, said last mentioned means being pivotally mounted and adapted to be swung into a position wherein access is afforded to said severing means, the center of gravity of said fur-receiving means being displaced to the opposite side of said pivotal axis when said means is swung into said position, and a stop engaged by said last mentioned means in said position.

43. In apparatus for cutting fur from pelts, fur severing means, means for feeding pelts to said severing means, means comprising a suction chamber for removing severed fur from the path of the severing means, means mounting said chamber for movement about a horizontal axis, and means for varying the position of said chamber about said axis.

44. In apparatus for cutting fur from pelts, fur severing means, means for feeding pelts to said severing means, means comprising a suction chamber for removing severed fur from the path of the severing means, means mounting said chamber for movement about a horizontal axis, means for varying the position of said chamber about said axis, and means for shifting said chamber and axis vertically.

45. In apparatus for cutting fur from pelts, fur severing means, means for feeding pelts to said severing means, a suction chamber extending adjacent said severing means, a foraminous belt passing over an opening in said chamber, a driving roller over which said belt passes, a second roller engaging said belt above the first roller, vertically shiftable bearing means for each of said rollers, spring means cooperating with said rollers to maintain gripping pressure on the belt therebetween, and means for shifting said bearing means vertically to compensate for variations in the length of said belt.

46. In apparatus for cutting fur from pelts, fur severing means, means for feeding pelts to said severing means, means for actuating said severing means into and out of fur severing position, continuous air blast means for removing severed fur from the path of said severing means as the latter is withdrawn from severing position, an endless belt engaging the pelt adjacent said severing means, and suction means cooperating with said belt for causing severed fur to be collected on said belt as said severing means is withdrawn from severing position.

47. In apparatus for cutting fur from pelts, fur severing means, means for feeding pelts to said severing means, an endless belt for receiving severed fur, suction means cooperating with said belt in a zone adjacent said severing means for retaining fur thereon, and means comprising a stationary element adjacent said belt for retaining fur thereon after passage beyond the range of action of said suction means, the distance between said belt and said stationary element diminishing slightly in the direction of travel of said belt whereby said element exerts a compressive action upon said fur.

48. In apparatus for cutting fur from pelts, fur severing means, means for feeding pelts to said severing means, an endless belt for receiving severed fur and conveying the same upwardly, means receiving the fur from said belt for passing said fur to a discharge point, and a roller external to said belt for assisting in passing said fur from said belt to the last mentioned means.

49. In apparatus for cutting fur from pelts, fur severing means, means for feeding pelts to said severing means, an endless belt for receiving severed fur and conveying the same upwardly, means extending forwardly from a point near the upper portion of said belt for receiving fur therefrom for passage to a discharge point, roller means over which said upper portion of said belt is passed, roller means external to said belt for assisting in passing fur therefrom to said forwardly extending means, and means mounted on the axis of the first mentioned roller means for supporting the second mentioned roller means.

50. In apparatus for cutting fur from pelts, fur severing means, means for feeding pelts to said severing means, an endless belt for receiving severed fur and conveying the same upwardly, means extending forwardly from a point near the upper portion of said belt for receiving fur therefrom for passage to a discharge point, roller means over which said upper portion of said belt is passed, roller means external to said belt for assisting in passing fur therefrom to said forwardly extending means, and means mounted on the axis of the first mentioned roller means for supporting the second mentioned roller means, and means for adjusting the first mentioned roller means vertically.

51. In apparatus for cutting fur from pelts, fur severing means, means for feeding pelts to said severing means, an endless belt for receiving severed fur and conveying the same upwardly, means extending forwardly from a point near the upper portion of said belt for receiving fur therefrom for passage to a discharge point, roller means over which said upper portion of said belt is passed, roller means external to said belt for assisting in passing fur therefrom to said forwardly extending means, means mounted on the axis of the first mentioned roller means for supporting the second mentioned roller means, means for adjusting the first mentioned roller means vertically, and spring means exerting a constant forward pull upon said supporting means for the second roller means.

52. In apparatus for cutting fur from pelts, fur severing means, means for feeding pelts to said severing means, an endless belt for receiving severed fur and conveying the same upwardly, means extending forwardly from a point near the upper portion of said belt for receiving fur therefrom for passage to a discharge point, roller means over which said upper portion of said belt is passed, roller means external to said belt for assisting in passing fur therefrom to said forwardly extending means, means for adjusting said first mentioned roller means, and means for maintaining said second roller means at a substantially constant distance from said belt despite adjustments of the first mentioned roller means.

53. In apparatus for cutting fur from pelts, fur severing means, means for feeding pelts to said severing means, an endless belt for receiving severed fur and conveying the same upwardly, means extending forwardly from a point near the upper portion of said belt for receiving fur therefrom for passage to a discharge point, roller means over which said upper portion of said belt is passed, roller means external to said belt for assisting in passing fur therefrom to said forwardly extending means, means for adjusting said first mentioned roller means, and means for maintaining said second roller means at a substantially constant distance from said belt and said forwardly extending means despite adjustments of the first mentioned roller means.

54. In apparatus for severing fur from pelts, a frame, fur severing means in said frame, means in said frame for feeding pelts to said severing means, suction means for collecting severed fur, a pump for maintaining suction in said suction means, and means connected to the exhaust side of said fan for blowing air beneath said feeding and severing means.

55. In apparatus for severing fur from pelts, a frame, fur severing means in said frame, means in said frame for feeding pelts to said severing means, suction means for collecting severed fur, a pump for maintaining suction in said suction means, means connected to the exhaust side of said fan for blowing air beneath said feeding and severing means, and valve controlled means for venting part of said air to atmosphere.

ROBERT H. PLASS.